Jan. 14, 1964    J. R. TAVIS    3,118,121
VARIABLE RELUCTANCE TRANSDUCER
Filed May 7, 1959
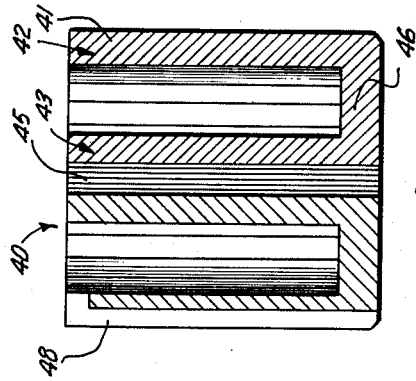
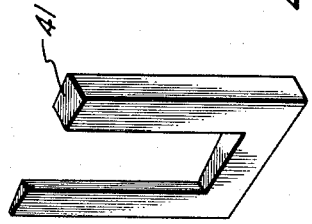
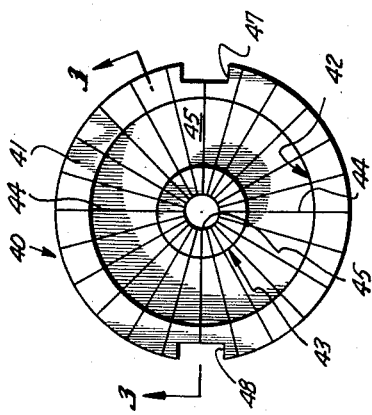
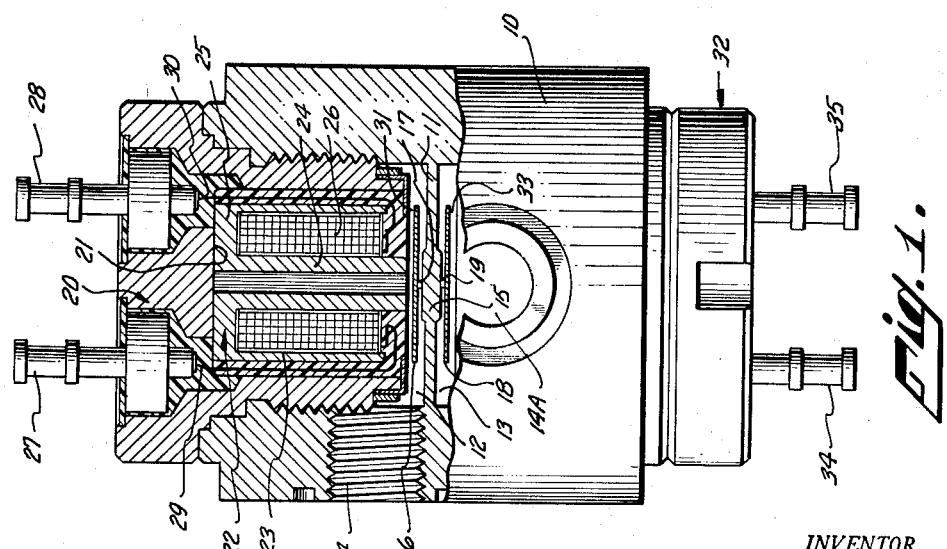
INVENTOR.
JOHN R. TAVIS
BY
Christie, Parker & Hale
ATTORNEYS.

United States Patent Office 3,118,121
Patented Jan. 14, 1964

3,118,121
VARIABLE RELUCTANCE TRANSDUCER
John R. Tavis, Sierra Madre, Calif., assignor to
Edcliff Instrument, Monrovia, Calif., a corporation
of California
Filed May 7, 1959, Ser. No. 811,726
6 Claims. (Cl. 336—30)

This invention relates to a condition responsive measurement and particularly to an electromechanical transducer in which variations in magnetic reluctance are utilized to measure variations in physical parameters such as, for example, pressure.

The principle that variations in the reluctance of a magnetic path cause changes in the inductance of an electrical coil has been embodied in various electromechanical transducers for the measurement of physical parameters such as pressure or acceleration. In such devices, variations in the physical parameter to be measured cause movement of a magnetic coupling so as to vary the reluctance of the magnetic path. The magnitude of the responsive variations in inductance of a coil or coils, when used with appropriate circuitry, create voltage or frequency changes proportionate to the magnitude of the variations in the physical parameter so that measurement of the magnitude of changes in output voltage or frequency provides by suitable calibration a measurement of the magnitude of the variation in the physical parameter causing the change.

A description of one embodiment of a variable reluctance transducer for the measurement of pressure will serve to illustrate prior art devices. An output coil is disposed adjacent a deflectable diaphragm plate of magnetic material. The coil is typically wound around the center post of an E-shaped core of magnetic material. The coil and core are disposed with relation to the diaphragm plate so that the complete magnetic path is from the center post of the core across the air gap to the diaphragm plate, through the diaphragm plate and across the air gaps between the diaphragm plate and each of the outer posts of the core, and through the outer posts and connecting member of the core to the center post of the core. As the air gap between the diaphragm plate and the posts of the core is varied responsive to pressure-induced deflections of the plate, the reluctance of the magnetic path is responsively changed.

Certain disadvantages are attendant upon the use of a magnetic core such as an E-shaped magnetic core in a variable reluctance transducer. Since the cross section of the center post is rectangular, the inside diameter of the coil formed around it must at a minimum equal the length of the diagonal of the center post. Because of the increased length of the winding, the coil therefore has a greater resistance than is necessary. Furthermore, the ratio of the reluctance of the air gap to the total reluctance of the magnetic path directly determines the sensitivity and linearity of the instrument and should be as high as can be obtained. Because of its geometry, it is difficult to obtain an optimum reluctance ratio in the E-shaped magnetic core.

These disadvantages of E-shaped cores can be overcome through the use of a magnetic core having a cylindrical outer ring and a cylindrical center post concentrically disposed and joined by a plate member closing one end of the core. A coil is formed around the cylindrical center post in the annular space between the center post and the outer ring. Such a core structure permits a more efficient coil winding since there exists no vacant space around the center post. Furthermore, such a core structure provides a ratio of reluctance of the air gap to total reluctance of the magnetic path which approaches the ideal ratio of one.

Where, however, the outer ring is a solid ring of magnetic material, relatively large eddy current losses are present. Furthermore, the solid outer ring acts in a manner similar to a shorted turn around the coil so that back E.M.F.'s are generated.

My invention provides a variable reluctance transducer in which the advantages of a cylindrical magnetic core are derived without the disadvantages attendant upon a solid outer ring. As one aspect of my invention there is provided in a variable reluctance transducer a magnetic core including a plurality of elements joined together and electrically insulated one from the other to form a laminated outer ring. A plate member joins the outer ring and an inner member to close one end of the core. A coil is formed around the inner member in the annular space between the inner member and the outer ring. A force responsive means is spaced by a gap from the open end of the magnetic core and is deflectable responsive to force variations to vary the gap between the magnetic core and the force responsive means. In a preferred embodiment of my invention, the elements are wedge-shaped elements having a U-shaped cross section.

The laminated structure of the magnetic core of my invention reduces eddy currents and back E.M.F.'s The resistance at A.-C. frequencies is therefore low and a very favorable ratio of resistance to inductance is obtained. The voltage across the coil may be increased so as to increase the power capabilities of the transducer.

As a second aspect of my invention, there is provided in a variable reluctance transducer a magnetic plate of high magnetic permeability joined to a force responsive means. The magnetic plate is spaced by a gap from the open end of a magnetic core and the coil formed within the magnetic core. Since the magnetic plate is joined to the force responsive means, it is movable responsive to force-induced deflections of the force responsive means to vary the gap between the magnetic plate and the magnetic core.

This second aspect of my invention minimizes another problem in variable reluctance transducers of the prior art which problem arises with respect to the force responsive means. The force responsive means, such as the diaphragm plate previously described, must be deflectable responsive to variations in the magnitude of the physical parameter being measured and must also act as a magnetic sensor and form a part of the magnetic path. For optimum performance, therefore, the force responsive means must possess good resilient qualities with high sensitivity to slight changes in magnitude of the parameter being measured and must also have high magnetic permeability. These requirements tend to be mutually exclusive in existing materials so that variable reluctance transducers of the prior art frequently utilize a force responsive means formed of a material the properties of which provide a compromise between these structural and magnetic requirements. The result is that optimum performance is not attainable. Furthermore, where differing thicknesses of the force responsive means are required over the varying operating ranges, varying inductances and sensitivities are obtained. This is because the magnetic reluctance of the force responsive means is inversely proportional to its cross-sectional area.

The magnetic plate in the variable reluctance transducer of my invention permits selection of the magnetic plate and the force responsive means on the basis of those separate characteristics which result in optimum performance of each. For the magnetic plate, a material may be selected having a magnetic permeability 30 to 100 times greater than it is possible where the functions of the magnetic plate and the force responsive means are combined in a single element. For the force responsive means, a material may be selected solely on the basis of its spring qualities without consideration of its magnetic properties. In the preferred embodiment, the magnetic plate is joined to the force responsive means by a single spot weld so that materials having dissimilar coefficients of thermal expansion may be combined without disadvantage.

The laminated magnetic core in the variable reluctance transducer of my invention is particularly adapted for use with the magnetic plate joined to a force responsive means. The advantages of each heretofore described are combined to provide an intsrument having performance characteristics of an unusual nature. However, each may be separately used in a variable reluctance transducer with advantageous results upon instrument performance.

The variable reluctance transducer of my invention together with its operation and attendant advantages will be more clearly understood from the following description made in conjunction with the accompanying drawings in which:

FIG. 1 is a broken-away elevational view, partially sectioned, of an embodiment of the variable reluctance transducer of my invention;

FIG. 2 is a plan view looking at the open end of the magnetic core of my invention removed from a transducer;

FIG. 3 is a view along line 3—3 of FIG. 2 showing a sectional elevation of the magnetic core of FIG. 2; and FIG. 4 is a perspective view of a wedge-shaped member used to form the magnetic core of my invention.

With reference to FIG. 1, an embodiment of a variable reluctance transducer of my invention useful in the measurement of differential pressures is shown. A cylindrical housing 10 is internally fitted with a diaphram plate 11 so that a first enclosure 12 and a second enclosure 13 are provided on opposite sides of the diaphragm plate. The diaphragm plate is peripherally sealed to the inner wall of the housing so that the first and second enclosures are isolated from each other. An internally-threaded bore 14 through the housing is provided for receiving a fitting to connect enclosure 12 and a source of varying pressure. A similar internally-threaded bore 14A through the housing is provided for receiving a fitting to connect enclosure 13 and another source of varying pressure.

Diaphragm plate 11 has a central portion 15 having a greater cross-sectional dimension than the surrounding portion of the diaphragm plate. A first magnetic plate 16 is joined by a single spot weld 17 to one side of the central portion of the diaphragm plate so as to be within enclosure 12. A second magnetic plate 18, aligned with the first magnetic plate, is joined by a single spot weld 19 to the other side of the central portion of the diaphragm plate so as to be within enclosure 13. Each of the magnetic plates therefore, as particularly shown in FIG. 1, is joined to a side of the diaphragm only by a spot weld and is otherwise spaced from the side of the diaphragm to which it is joined. The thickness of the central portion of the diaphragm plate is such that its deflection responsive to pressure variations is negligible. The surrounding portion of the diaphragm plate is deflectable responsive to variations in differential pressure across the plate and its deflections produce corresponding movements of the first and second magnetic plates. Each of the magnetic plates has a high magnetic permeability and, since the material is chosen for this characteristic alone, can have a magnetic permeability in the range from 10,000 to 100,000 or greater.

The inner surface of the housing defining in part enclosure 12 is internally threaded to receive a correspondingly threaded sensing element insert 20. The sensing element insert is provided with a cylindrical insert enclosure 21 centrally formed within the sensing element insert. A laminated magnetic core 22 having a cylindrical outer ring 23 and a cylindrical inner ring 24 concentrically disposed and joined together at one end by a plate 25 closing one end of the core is fitted within the enclosure so that the open end of the core faces magnetic plate 16. The laminated magnetic core is described in greater detail below with reference to FIGS. 2–4. An electrical coil 26, consisting of a conductive wire wound around the cylindrical inner ring of the magnitude core, fills the annular space between the inner ring and the outer ring of the magnetic core. The magnetic core together with the coil are sealed within insert enclosure 21 by a suitable potting resin such as an epoxy resin.

Electrical terminals 27, 28 pass through the top end of the sensing element insert and are sealed therein with a potting resin. Electrical leads 29, 30 provide an electrical connection between electric terminals 27, 28 and the coil. The sensing element insert therefore conveniently contains the magnetic core, the coil, and electrical leads and terminals for insertion within the housing. When the insert is threaded into the housing, the magnetic core and the coil are positioned so that a fixed gap 31 is provided between the end of the insert element and magnetic plate 16.

Gap 31 is varied by movements of the magnetic plate toward and away from sensing element insert 20 responsive to variations in differential pressure which produce deflections of diaphragm plate 11. The variations in gap 31 vary the reluctance of the magnetic path which is from inner ring 24 of the core across gap 31 to magnetic plate 16, through the magnetic plate toward its periphery, across gap 31 to outer ring 23, and through plate 25 at the closed end of the core to inner ring 24.

A second sensing element insert 32 is threadably inserted within the inner surface of the housing defining in part enclosure 13. This insert is identical to sensing element insert 20 and is positioned when threaded into the housing so that a fixed gap 33 is provided between it and magnetic plate 18. Insert 32 has a pair of electrical terminals 34, 35 electrically connected to the coil within the insert (not shown).

Upon variations in differential pressure, the magnetic plates are moved toward or away from their respective magnetic core. For example, when magnetic plate 16 is moved toward magnetic core 22, thereby decreasing the reluctance with respect to the magnetic path through its magnetic core, magnetic plate 18 is moved away from its magnetic core, thereby increasing the reluctance with respect to the magnetic path through its magnetic core. The coils are externally connected in a suitable circuit whereby the changes in reluctance produce responsive changes in output voltage.

With respect to FIGS. 2, 3 and 4, a laminated magnetic core 40 of my invention, removed from within a transducer, is shown in plan view and sectional elevation. The magnetic core is formed from a plurality of wedge-shaped elements 41 having a substantially U-shaped cross section. A single wedge-shaped element is particularly shown in perspective view in FIG. 4. These elements are mounted adjacent one another and potted to provide a continuous magnetic core having an outer cylindrical ring 42 and an inner cylindrical ring 43. Each wedge-shaped element is electrically isolated from the next adjacent elements by an intervening electrical insulating layer 44. Inner cylindrical ring 43 defines an axial opening 45. The magnetic core is closed at one end by a plate 46 formed by the juxtaposed closing ends of the wedge-shaped members and extending between the inner and outer rings. Two diametrically opposed wedges are shortened to provide passages 47, 48 for electrical leads.

In the magnetic core of my invention, the cross-sectional area of outer ring 42 is many times greater than the cross-sectional area of the inner ring 43. As a result, the magnetic reluctance at the air gap between inner ring 43 and the diaphragm plate is many times greater than the magnetic reluctance between the outer ring and the diaphragm plate. The sensitivity of a variable reluctance transducer embodying the magnetic core of my invention is thereby increased since small deflections of the magnetic plate are readily sensed.

The use of wedge-shaped elements to form the laminated magnetic core of my invention provides a circular core having the advantages previously described. Since the wedge-shaped elements are electrically insulated one from the other, eddy current losses and back E.M.F.'s are significantly reduced. The use of the laminated magnetic core of my invention in an instrument provides an instrument having constant and high sensitivity over a wide operating range and an improved linearity of output voltage to input voltage.

The advantageous features of the laminated magnetic core of my invention in a variable reluctance transducer such as described with reference to FIG. 1 are demonstrable. The transducer is capable of a signal output of 0.150 volt output per volt input with a linearity of ±1% of the best straight line. Such an output represents an improvement of 50% to 150% more output than an instrument of comparable linearity without the features of my invention. Furthermore, such an output is approximately 75% of the ideally attainable output. The sensitivity of the instrument is substantially constant in the range from 1000 cycles per second to 20,000 cycles per second while the phase shift of output to input over this range of excitation frequencies remains less than 10°. Also, a large useful power output, for example 0.035 watt with 400 cycles per second excitation and 0.07 watt at 3000 cycles per second excitation, is realizable.

While the variable reluctance transducer of the present invention has been described with reference to an instrument for the measurement of differential pressures, it is to be understood that its features may be advantageously embodied in instruments for measuring other physical parameters. Furthermore, it is to be understood that the laminated magnetic core of my invention may be advantageously utilized in instruments utilizing one or more coils.

I claim:

1. A variable reluctance transducer for the measurement of pressure comprising a housing, a magnetic core within the housing and including a plurality of elements joined together to form a laminated outer ring, means between said elements electrically insulating one from the other, an inner member and a plate joining the outer ring and the inner member to close one end of the core, a coil formed around the inner member in the annular space between the inner member and the outer ring, electrical means connected to the coil, an imperforate force responsive means disposed adjacent the open other end of the magnetic core and deflectable responsive to force variations, the force responsive means constructed to have a thicker cross section at its central portion than in its remaining portion, and a magnetic plate of high magnetic permeability joined to the force responsive means at a spot by welding to the central portion of the force responsive means to be spaced therefrom and to be separated by a gap from the open other end of the magnetic core and movable responsive to deflections of the force responsive means to vary the gap between the magnetic plate and the magnetic core.

2. A variable reluctance transducer for the measurement of pressure comprising a housing, an open-ended magnetic core within the housing and including means forming a magnetic path, a coil formed within the magnetic core, electrical means connected to the coil, an imperforate force responsive means disposed adjacent the open end of the magnetic core and deflectable responsive to force variations, the force responsive means constructed to have a thicker cross section at its central portion than in its remaining portion, and a magnetic plate of high magnetic permeability joined to the force responsive means by welding to the central portion of the force responsive means to be spaced therefrom and to be separated by a gap from the open end of the magnetic core and movable responsive to deflections of the force responsive means to vary the gap between the magnetic plate and the magnetic core.

3. A variable reluctance transducer for the measurement of pressure comprising a housing, an open-ended magnetic core within the housing and including means forming a magnetic path, a coil formed within the magnetic core, an imperforate diaphragm plate disposed adjacent the open end of the magnetic core and deflectable responsive to pressure variations, the diaphragm plate integrally formed with the housing and having a central portion of thicker cross section than the remaining portion of the diaphragm plate, and a magnetic plate of high magnetic permeability joined at a spot by welding to the central portion of the diaphragm plate to be spaced therefrom and to be separated by a gap from the open end of the magnetic core and movable responsive to deflections of the diaphragm plate to vary the gap between the magnetic plate and the magnetic core.

4. A variable reluctance transducer for the measurement of pressure comprising a housing, an imperforate diaphragm plate deflectable responsive to pressure variations and disposed within the housing to form separate first and second enclosures, the diaphragm plate constructed to have a thicker cross section at its central portion than in its remaining portion, first and second magnetic plates of high magnetic permeability joined to opposite sides of the diaphragm plate at a spot by welding to said central portion to be spaced from each side and within the first and second enclosures respectively, first and second magnetic cores within the first and second enclosures respectively, each magnetic core including a laminated cylindrical outer ring and a laminated cylindrical inner ring concentrically disposed and joined by a plate member closing one end of the core, first and second coils formed around the inner rings of the first and second magnetic cores respectively, electrical means connected to the first and second coils respectively, the open other end of the first and second magnetic cores disposed to be spaced by a gap from the first and second magnetic plates respectively whereby movements of the magnetic plates responsive to deflections of the diaphragm plate vary the gaps between the first and second magnetic cores and the first and second magnetic plates respectively.

5. Transducer in accordance with claim 4 wherein each magnetic core, coil and electrical means are contained within an insert sealably fittable within the housing in the first and second enclosures respectively.

6. Transducer in accordance with claim 4 wherein the first and second enclosures are joined to separate sources of varying pressure so that the diaphragm plate is deflectable responsive to variations in the pressure differential.

References Cited in the file of this patent

UNITED STATES PATENTS

| | | |
|---|---|---|
| 1,169,038 | Jones | Jan. 18, 1916 |
| 1,718,494 | Schurig | June 25, 1929 |
| 2,579,308 | Dole | Dec. 18, 1951 |
| 2,878,425 | Kudoh | Mar. 17, 1959 |
| 2,884,608 | Jessen | Apr. 28, 1959 |

FOREIGN PATENTS

| | | |
|---|---|---|
| 82,032 | Denmark | Feb. 11, 1957 |